United States Patent [19]

Halsey

[11] 4,109,780
[45] Aug. 29, 1978

[54] CONVEYOR SYSTEMS WITH GATING ARRANGEMENT

[75] Inventor: Arthur Ernest Halsey, Horsham, England

[73] Assignee: Vacuumatic Limited, Harwichm Essex, England

[21] Appl. No.: 707,389

[22] Filed: Jul. 21, 1976

[30] Foreign Application Priority Data

Jul. 31, 1975 [GB] United Kingdom ............... 32096/75

[51] Int. Cl.$^2$ ...................... B65G 37/00; B65G 21/14
[52] U.S. Cl. ..................................... 198/466; 198/483; 198/575; 198/812
[58] Field of Search ............... 198/459, 460, 461, 466, 198/471, 594, 718, 719, 812, 483, 575

[56] References Cited

U.S. PATENT DOCUMENTS

| | | | |
|---|---|---|---|
| 1,826,885 | 10/1931 | Hoppe et al. .......................... | 198/804 |
| 3,081,863 | 3/1963 | Monohan .............................. | 198/466 |
| 3,111,214 | 11/1963 | Heikinheimo ........................ | 198/460 |
| 3,150,761 | 9/1964 | Pinault et al. ......................... | 198/812 |
| 3,217,859 | 11/1965 | Bartlo et al. .......................... | 198/460 |
| 3,371,769 | 3/1968 | Beninger .............................. | 198/466 |
| 3,424,293 | 1/1969 | Deutschlander ..................... | 198/459 |
| 3,460,667 | 8/1969 | Lanham .............................. | 198/812 |
| 3,556,280 | 1/1971 | Schnee et al. ....................... | 198/812 |
| 3,608,695 | 9/1971 | Hellstrom ........................... | 198/471 |
| 3,842,963 | 10/1974 | Kemper .............................. | 198/812 |

*Primary Examiner*—Evon C. Blunk
*Assistant Examiner*—Jeffrey V. Nase
*Attorney, Agent, or Firm*—Mawhinney & Mawhinney & Connors

[57] ABSTRACT

A conveyor system for delivering articles in succession has an endless conveyor loop, which is guided by guide rollers around a closed path including a horizontally extending run having an upstream end and a downstream end. The guide roller at one end of the horizontally extending run of the closed path and a further guide roller in a part of the path other than the horizontally extending run are mounted on a support, which is pivoted by a reciprocating mechanism so as to cyclically extend and retract the horizontal run of the path at its one end while maintaining tension in the conveyor loop. A gate is located adjacent the upstream end of the horizontally extending run to provide a sequential flow of articles to such horizontally extending run.

20 Claims, 12 Drawing Figures

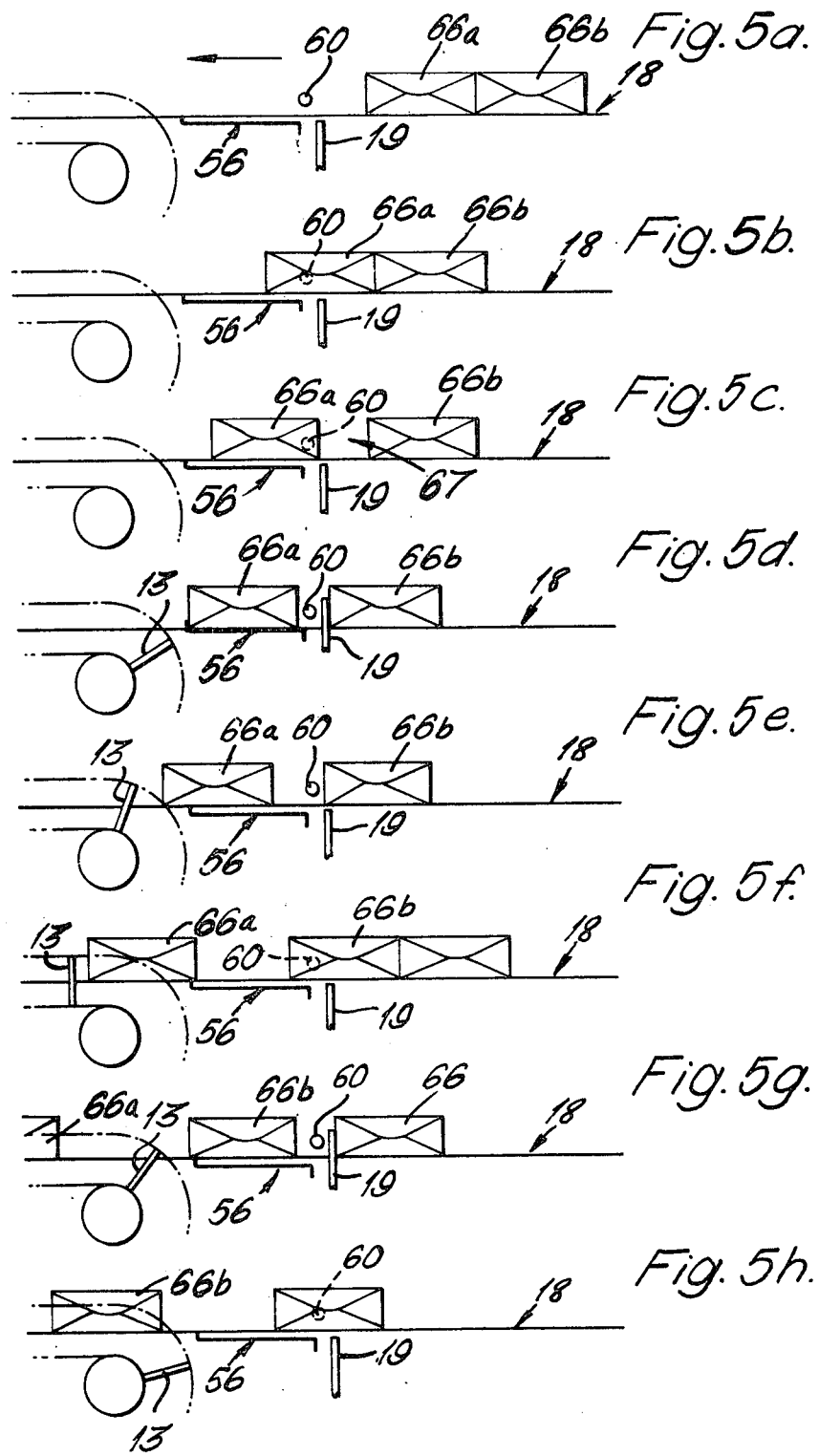

CONVEYOR SYSTEMS WITH GATING ARRANGEMENT

The invention relates to a conveyor system.

According to the present invention there is provided a conveyor system for delivering articles in succession comprising an endless conveyor loop, means to guide the loop around a closed path including a horizontally extending run, means for cyclically extending and retracting the horizontal run of the path at one end thereof, and gating means located adjacent the upstream end of the horizontal run so as to provide a sequential flow of articles to the horizontal run of the conveyor system.

The conveyor system may further comprise means for temporarily retaining an article adjacent the horizontal extending run of the path.

The conveying which is a first conveyor system, preferably is located between the downstream end of a second conveyor system defining an article support surface, and the upstream end of a third conveying system having a horizontally extending article support surface located generally in alignment with the horizontal run of the first conveyor system, the third conveyor system including spaced article displacement elements, which sweep over the support surface to displace articles along the surface, the extending and retracting end of the first conveyor system being located adjacent said upstream end of the third conveyor system and the cyclically operating means for extending and retracting said end of the first conveyor system being timed in relation to the third conveyor system to retract the end of the first conveyor system to permit an article displacement member on the third conveyor system to pass between the two conveyor systems and then to extend to lie adjacent the second conveyor until the next article displacement member approaches.

The gating means preferably comprise a gate disposed between the first and second conveyor system and movable between the article support surface of the second conveyor system and the horizontally extending run of the first conveyor system in a direction transverse the direction of travel of the articles such that in a first position it inhibits an article from being delivered to the first conveyor system by the second conveyor system, and in a second position it allows the article to be delivered from the second conveyor system to the first conveyor system. Control means is provided for controlling the gate means such that no more than one article at a time is supported by the endless conveyor loop of the first conveyor system. The control means preferably includes means for detecting whenever an article is delivered to the first conveyor system, and means for indicating the position of the next article displacement member.

Preferably the first conveyor system is arranged to accelerate each article off the second conveyor system.

The means for temporarily retaining an article may be connected to said detecting means and said indicating means such that the means are activated whenever an article is on the first conveyor system and the next article displacement member lies within a predetermined segment of its path.

The endless conveyor loop of the first conveyor system preferably comprises a plurality of parallel belts spaced in a direction transverse to the direction of travel of the article. In which case the means for temporarily retaining an article may comprise a platform of spaced plates, movably mounted such that when the retaining means are activated each plate passes through a respective space between the belts to lift the article off the belts.

The third conveyor system may include a fourth conveyor system for removing each article from the first conveyor system before its end is retracted, the fourth conveyor system having an article support surface and being disposed between and generally horizontally aligned with the article support surface of the third conveyor system and the horizontal part of the path of the first conveyor system.

A specific embodiment of the invention will now be described with reference to the accompanying drawings, in which.

Figure 2:
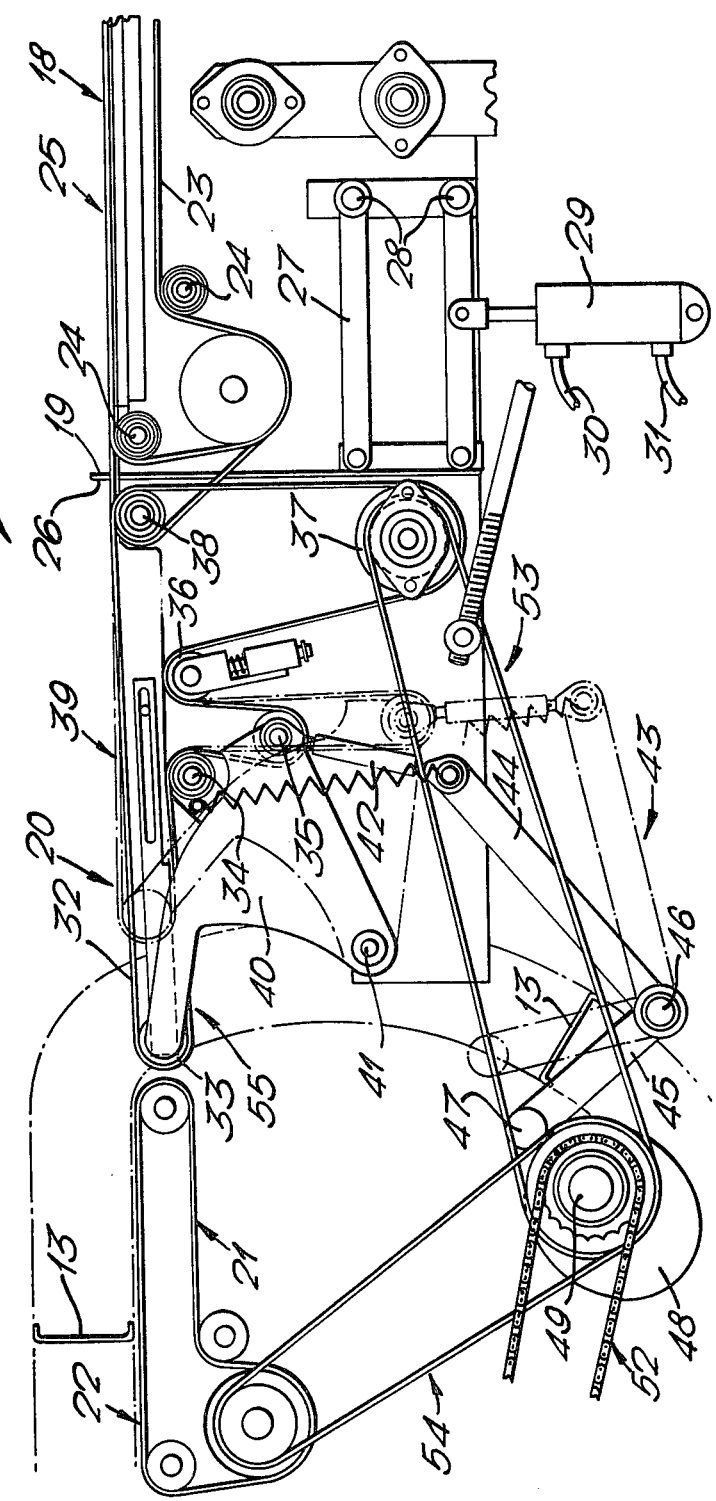
FIG. 2 is a partially schematic side view of an infeed conveyor system of the weighing machine of FIG. 1.

FIGS. 5a to h are schematic side views of the infeed conveyor system of FIG. 2, each showing a successive stage in the delivering of articles in succession to the paddle conveyor.

Figure 1:
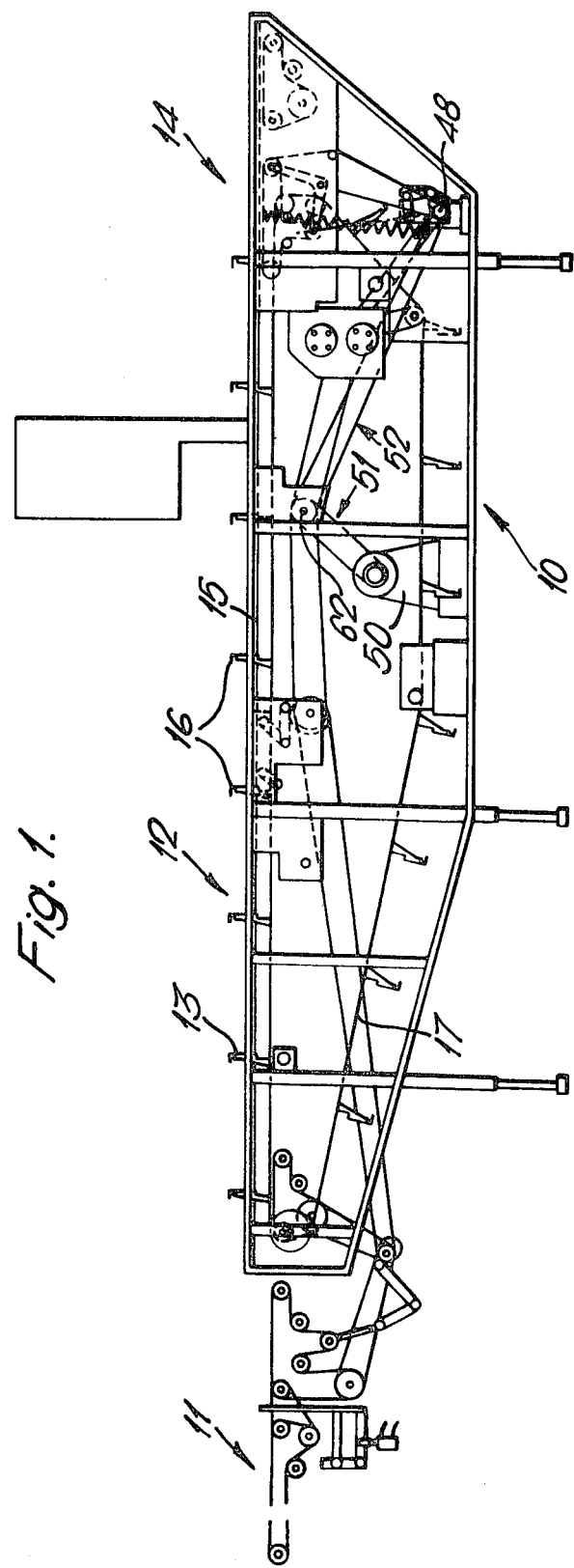
FIG. 1 is an elevation of a weighing apparatus with its drive system shown in semi-diagrammatic form.

FIG. 1 shows a weighing apparatus of the type described in copending U.S. Pat. application Ser. No. 707,390 corresponding to United Kingdom patent application No. 31674/75, having an infeed system as described in copending U.S. patent application Ser. No. 707,688 corresponding to United Kingdom patent application No. 32096/75.

The weighing apparatus, generally indicated at 10, includes a conveyor infeed system, generally indicated at 11, a paddle conveyor system, generally indicated at 12, having paddles 13 and an outfeed conveyor system in the form of a reciprocating system, generally indicated at 14.

The paddle conveyor system, only the paddles of which are shown in FIG. 2, is of the type having a generally horizontal conveyor bed 15, over which spaced paddles 13 run. Each pair of paddles 13 forms an article receiving space 16 or pocket and each article in a respective pocket is slid along the conveyor bed by the trailing paddle. At the upstream end of the conveyor, the paddles, which are mounted between continuous chains, one of which is indicated at 17, disposed either side of the conveyor bed 15 have to pass through the level of the conveyor bed 15.

The infeed conveyor system 11 includes a supply conveyor 18, a gate 19 and a reciprocating conveyor system 20, a conveyor 21, which defines a generally horizontal article support surface 22, which forms the upstream end of the conveyor bed of the paddle conveyor.

The supply conveyor 18 consists of a driven endless belt 23, part of which is shown, supported on rollers 24 to define an article support surface 25.

The gate 19 consists of a plurality of spaced fingers 26, one of which is shown in FIG. 1, mounted on parallel spaced arms 27. The arms 27 are pivotably mounted at pivots 28. A double acting pneumatic ram 29 is provided to pivot the arms between a first or 'closed' position, as shown in FIG. 2, in which the free ends of the fingers 26 protrude above the level of article support surface 25 and a second or 'open' position in which the free ends of the fingers are located below the level of article support surface 25. The double acting pneumatic ram 29 is connected by air lines 30 and 31 to an air source (not shown) via control means (not shown).

The reciprocating conveyor system 20 comprises a plurality of spaced parallel endless belts 32, one of which is shown in FIG. 1, each belt 32 being mounted around a movable roller 33, a fixed roller 34, a movable roller 35, a fixed roller 36, driven pulley 37 and fixed roller 38. The spaced belts 32 form an extendable article support surface at 39. Movable rollers 33 and 35 are mounted on a rocker member 40, which is pivotably mounted at pivot 41. A connecting link 42 has one end connected to rocker member 40 and its other end connected to a conventional reciprocating mechanism 43. The conventional reciprocating mechanism 43 comprises a first lever 44, one end which pivotably connected to link 42 and the other of which is connected to one end of a second lever 45 by pivot 46. The other or free end of second lever 45 carries a cam follower 47, which engages a cam 48 which is rotatably mounted on shaft 49. The shaft 49 is driven from a motor 50, which also drives chains 17, by drives 51 and 52. Shaft 49 in turn drives conveyor systems 20 and 21 by drives 53 and 54 respectively. The link 42 is biassed into its solid line position by a spring 55 which is connected between the 42 and the chassis of the weighing apparatus 10. The mode of operation of a reciprocating conveyor means of the type shown in FIG. 1 is described in detail in copending application Serial No. 707,688.

Essentially the connecting link 42 is raised and lowered by the conventional reciprocating mechanism 43 between its raised position shown in solid line and its lowered position indicated by the dotted line outline of roller 35. The raising and lowering of the connecting link 42 causes the rocker member 40 to pivot about pivot 41 and hence causes the movable rollers 33 and 35 to move between the solid line positions and the dotted line positions shown in FIG. 2.

When roller 33 moves into its solid line position it extends the article support surface 39 to a point adjacent the upstream end of conveyor 21 when the roller 33 moves into its dotted line position it retracts the article support surface 39 to leave a space 55, through which the paddle 13 may pass. The corresponding movements of the movable roller 35 provides and takes up the extra length of belt needed to allow the extending of the article support surface 39.

Figure 3:
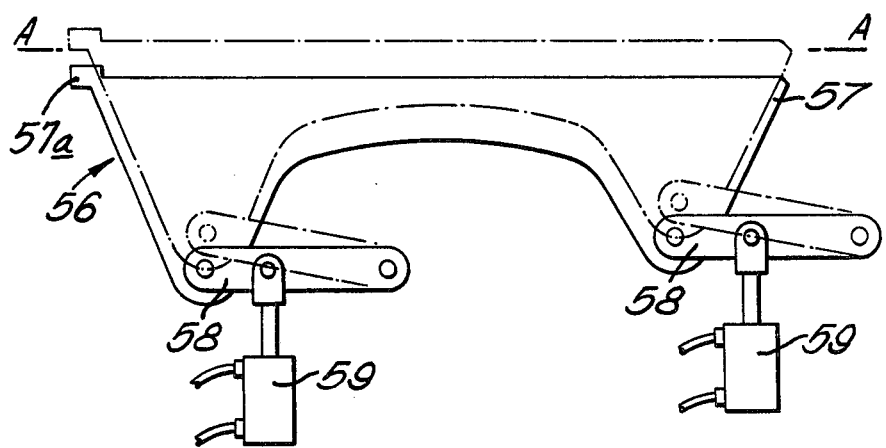
FIG. 3 is a schematic side view of an article inhibit device for use with infeed conveyor system of FIG. 2.

FIG. 3 shows a side view of an inhibit device 56, which comprises a plurality of spaced plates 57, the outer of which is shown in FIG. 3, fixed relative to each other and mounted on arms 58 beneath the article support surface 39, with each plate in registration with a space between the belts 32. The arms are supported by double acting pneumatic rams 59 which in operation raises and lowers the arm 58 and hence the plates 57 between the solid line position in which the upper surface of the plates are beneath the level of the article support surface 39, and the dotted line position in which the upper surfaces of the plates protrude above the article support surface 39, each plate passing through its respective space between a pair of belts 32. The line A—A denotes the level of surface 39. The inhibit device may be formed with a lip 57a at its downstream end to retain an article or alternatively the upper surface of the plates 57.

Figure 4:
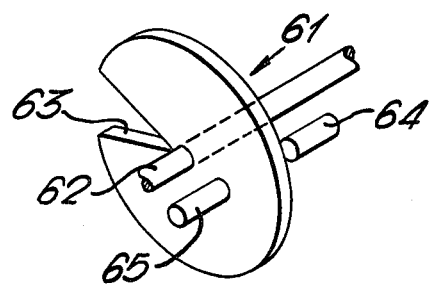
FIG. 4 is a schematic view of a timing device.

The double acting pneumatic rams 29 and 59 which operate the gate 19 and the inhibit device 56 respectively, are controlled by a photo electric cell 60 (see FIGS. 5a to h) and by a timing vane 61 (see FIG. 4).

The timing vane 61 comprises a metal disc mounted on a shaft 62 and having a cut-out segment 63. The shaft 62 is connected to the motor 50 by drive 51 such that one complete rotation of the shaft 62 represents a movement of the chains of one pocket length. A magnetic source 64 and an electromagnetic detector 65 are positioned on either side of the timing vane 61 at locations which represent the space 55. The cut-out segment 63 represents the position of a paddle on the chains and a predetermined length of chain on either side of the paddle. Thus when the cut-out segment 63 is adjacent the source 64 and detector 65, a paddle is in the vicinity of the space 55 and the detector 65 gives an output signal to a control system (not shown) for the whole of the period, during which the cut-out segment 63 passes between the source 64 and the detector 65. This period will hereinafter be known as the 'danger' period.

The operation of the infeed conveyor system will now be described with reference to FIGS. 5a to 5h. An operator or another conveyor deposits articles 66 on the supply conveyor 18, at a rate, which may be irregular. However each article 60 must arrive on the conveyor 21 as its respective pocket is being formed, equally no article 66 must arrive at the conveyor 21 when a paddle 13 is passing through the space 55.

In order to achieve registration between the arrival of the articles at the conveyor 18 and the formation of a pocket, the infeed conveyor system is controlled in the following manner.

If there is no output signal from detector 65, the double acting pneumatic ram 24 moves gate 19 into its open position in response to the control system (not shown) allowing the leading article 66a to pass on to support surface 39. As the endless belts 32 are driven at a greater speed than the belt 23, the article 66a is accelerated away from the next article 66b creating a space 67. As the article 66a passes the photo-electric cell 60 it interrupts the light path between the cell 60 and a light source (not shown). As soon as the trailing edge of the article 66a passes the photo-cell 60, the light path is reinstated and the gate 19 is closed (see FIG. 5d), and it remains closed until the subsequent output signal from the detector 65 disappears.

If when the article 66a arrives on the support surface 39 a paddle 13, has just passed through the space 55, then the reciprocating mechanism 43 will be moving into its extended position and the article 66a will be delivered to conveyor 21 in a pocket between paddles 13. Meanwhile the gate 19 will have been moved to its open position in response to a control signal generated in response to the end of the output signal from the detector 65, and article 66b will be transferred onto the support surface 39, and subsequently into that pocket to be formed.

However, as shown in FIG. 5d, if the article 66a arrives on the support surface 39 and completely passes the photo-electric cell 60 during the 'danger' period i.e. when the paddle is either in or approaching the space 55, then the inhibit device 56 is activated by the presence of output signals from both the photoelectric cell 60 and the detector 65. On activation of the inhibit device 56 the plates 57 pass through spaces between the belts 32, and lift the article 66a above the level of belts 32 and retain the article 66a above the belts 32 until the end of the 'danger' period (see FIG. 5d). At the end of the 'danger' period the output signal from the detector 65 disappears, the inhibit device 57 is lowered and the article 66a passes onto the conveyor 21 (see FIG. 5f), as before. At the same time the gate 19 is lowered and article 66b is transferred onto the support surface 39 and into its respective pocket (see FIG. 5f to 5h).

As the reciprocating conveyor 20 is reciproacted in accordance with the speed of the paddle conveyor chains 17, once registration between the arrival of articles 66 and pockets is achieved, it will normally be kept for the whole of that period of operation. Thus the inhibit device 56 will normally only operate when the apparatus 10 is started or for example, when an article slips on the belts 32.

Preferably the photo-electric cell 60 is mounted for horizontal movement so that its position can be adjusted to alter the timing of the operation of the gate 19 and the inhibit device 56 in accordance with the article length.

I claim:

1. A conveying apparatus comprising:
   a first conveyor system; comprising an endless conveyor loop, means to guide the conveyor loop around a closed path including a horizontally extending run having an upstream end and a downstream end, means to drive the endless conveyor loop and move the horizontally extending run, means for cyclically extending and retracting the horizontal run of the path at one of said ends into and out of an article discharging position; and gating means located adjacent the upstream end of the horizontal run for providing a sequential flow of articles to the horizontal run;
   a second conveyor system defining an article support surface;
   a third conveyor system having a horizontally extending article support surface, article displacement elements, means for mounting the article displacement elements around an endless path part of which extends along the horizontally extending article support surface, and means for driving the article displacement elements around the closed path to sweep over the horizontally extending article support surface to displace articles along the horizontally extending article support surface;
   the first conveyor system being located between the downstream end of the second conveyor system and the upstream end of the third conveyor system with its horizontally extending run in general alignment with the article support surfaces of the second and third conveyor systems, the upstream end of the article support surface of the third conveyor system and the one end of the horizontally extending run defining a space in their common plane, when said one end is in its retracted position; and means for coupling the cyclically operating means in timed relation with the drive means of the third conveyor system whereby the one end of the horizontally extending run is retracted to permit an article displacement member on the third conveyor system to pass through the space and then extend across the space to lie adjacent the third conveyor system until the next article displacement member approaches.

2. Conveying apparatus according to claim 1 wherein the gating means comprises a gate disposed between the first and second conveyor system and movable between the article support surface of the second conveyor system and the horizontally extending run of the first conveyor system in a direction transverse the direction of travel of the articles such that in a first position it inhibites an article from being delivered to the first conveyor system by the second conveyor system, and in a second position it allows the article to be delivered from the second conveyor system to the first conveyor system.

3. Conveying apparatus according to claim 2 further comprising means for controlling the gating means such that no more than one article at a time is supported by the endless conveyor loop of the first conveyor system.

4. Conveying apparatus according to claim 3 wherein the control means includes means for detecting whenever an article is delivered to the first conveyor system, and means for indicating the position of the next article displacement member.

5. Conveying apparatus according to claim 1 wherein the first conveyor system is arranged to accelerate each article off the second conveyor system.

6. A conveying apparatus according to claim 1 further comprising means for temporarily retaining an article in the horizontally extending run of the path.

7. Conveying apparatus according to claim 6 including means for detecting whenever an article is delivered to the first conveyor system and means for indicating the position of the next article displacement member, the means for temporarily retaining an article being connected to the detecting means and such indicating means so that the means for temporarily retaining an article is activated whenever an article is on the first conveyor system and the next article displacement member lies within a predetermined segment of its path.

8. Conveying apparatus according to claim 7 wherein the endless conveyor loop of the first conveyor system comprises a plurality of parallel belts spaced in a direction transverse to the direction of the travel of an article thereon.

9. Conveying apparatus according to claim 8 wherein the means for temporarily retaining an article comprises a platform of spaced plates that are movably so that when the retaining means are actuated each plate passes through a respective space between the belts to lift the article off the belts.

10. Conveying apparatus according to claim 9 wherein the third conveyor system includes a fourth conveyor system for removing each article from the first conveyor system before the end of the horizontal run is retracted, the fourth conveyor system having an article support surface and being disposed between and generally horizontally aligned with the article support surface of the third conveyor system and the horizontal run of the path of the first conveyor system.

11. A conveying apparatus comprising:
    a first conveyor system comprising an endless conveyor loop, means to guide the conveyor loop around a closed path including a horizontally extending run having an upstream end and a downstream end, means to drive the endless loop and move the horizontally extending run, means for cyclically extending and retracting the horizontal run of the path at one of said ends into and out of an article discharging position, a gating means located adjacent the upstream end of the horizontal run for providing a sequential flow of articles to the horizontal run of the first conveyor system; a second conveyor system defining an article support surface; a third conveyor system having a horizontally extending article support surface, article displacement elements, means for mounting the article displacement elements around an endless path part of which extends along the horizontally extending article support surface, means for driving the article displacement elements around the closed path to sweep over the horizontally extending article support surface to displace articles along the horizontally extending article support surface; the first conveyor system being located between the downstream end of the second conveyor system and the upstream end of the third conveyor system with its horizontally extending run in general alignment with the article support surfaces of the second and third conveyor systems, the upstream end of the article support surface of the third conveyor system at the retractable end of the horizontal extending run defining a space in a common plane, when said retractable end is in its retracted position; and means for actuating the cyclically operating means in timed relation with the drive means of the third conveyor system whereby the retractable end of the horizontally extending run is retracted to permit an article displacement member on the third conveyor system to pass through the space and then extend across the space to lie adjacent the third conveyor system until the next article displacement member approaches.

12. Conveying apparatus according to claim 11 wherein the gating means comprises a gate disposed between the first and second conveyor systems and movable between the article support surface of the second conveyor system and the horizontally extending run of the first conveyor system in a direction transverse to the direction of travel of the articles such that in a first position it inhibits an article from being delivered to the first conveyor system by the second conveyor system, and in a second position it allows the article to be delivered from the second conveyor system to the first conveyor system.

13. Conveying apparatus according to claim 12 further comprising means for controlling the gating means so that no more than one article at a time is supported by the endless conveyor loop of the first conveyor system.

14. Conveying apparatus according to claim 13 wherein the control means includes means for detecting whenever an article is delivered to the first conveyor system, and means for indicating the position of the next article displacement member.

15. Conveying apparatus according to claim 14 wherein the first conveyor system is arranged to accelerate each article off the second conveyor system.

16. A conveying apparatus according to claim 14 comprising means for temporarily retaining an article in the horizontally extending run of the path of the first conveyor system.

17. Conveying apparatus according to claim 16 wherein the means for temporarily retaining an article is connected to said detecting means and said indicating means such that the means are activated whenever an article is on the first conveyor system and the next article displacement member lies within a predetermined segment of its path.

18. Conveying apparatus according to claim 17 wherein the endless conveyor loop of the first conveyor system comprises a plurality of parallel belts spaced in a direction transverse to the direction of the travel of an article thereon.

19. Conveying apparatus according to claim 18 wherein the means for temporarily retaining an article comprises a platform of spaced plates that are movably mounted so that when the retaining means are actuated each plate passes through a respective space between the belts to lift the article off the belts.

20. Conveying apparatus according to claim 19 wherein the third conveyor system includes a fourth conveyor system for removing each article from the first conveyor system before its retractable end is retracted, the fourth conveyor system having an article support surface and being disposed and generally horizontally aligned with the article support surface of the third conveyor system and the horizontal run of the path of the first conveyor system.

* * * * *